United States Patent [19]

Morlotti

[11] Patent Number: 5,367,173
[45] Date of Patent: Nov. 22, 1994

[54] METHOD FOR RECORDING AND REPRODUCING A RADIATION IMAGE, APPARATUS USING SAID METHOD, PANEL FOR STORING THE RADIATION IMAGE AND PHOTOSTIMULABLE PHOSPHOR

[75] Inventor: Romano Morlotti, Varazze, Italy

[73] Assignee: Minnesota Mining & Manufacturing Company, St. Paul, Minn.

[21] Appl. No.: 128,651

[22] Filed: Sep. 30, 1993

[30] Foreign Application Priority Data

Nov. 12, 1992 [IT] Italy .......................... MI92A 002593

[51] Int. Cl.$^5$ ...................... G01N 23/04; C09K 11/67
[52] U.S. Cl. ................................. 250/484.4; 250/585; 252/301.4 R; 252/301.4 F; 252/301.5; 252/301.6 R; 428/690
[58] Field of Search ...................... 252/301.4 R, 301.5, 252/301.6 R; 250/484.4, 327.2, 585, 586; 428/690

[56] References Cited

U.S. PATENT DOCUMENTS

| | | | |
|---|---|---|---|
| 3,459,674 | 8/1969 | Emoto et al. | 252/301.4 R |
| 4,024,069 | 5/1977 | Larach | 252/301.4 R |
| 5,120,619 | 6/1992 | Nakajima et al. | 252/301.4 R |

OTHER PUBLICATIONS

Blasse et al. "J of Solid State Chemistry", 3, pp. 69–74 (1971).

*Primary Examiner*—Jack Cooper
*Attorney, Agent, or Firm*—Gary L. Griswold; Walter N. Kirn; Mark A. Litman

[57] ABSTRACT

The present invention relates to new phosphors for use in panels, apparatus and methods for recording and reproducing a high energy radiation image, including the steps of stimulating a phosphor image-wise exposed to radiation and detecting the fluorescent light emitted by said phosphor upon stimulation, said phosphor being a green emitting terbium activated alkali metal tantalate, doped with at least one element selected in the group consisting of Mg, Ca, Sr, Ba, Al, Ga, Ge, Pb, Bi, transition elements and lanthanides.

18 Claims, No Drawings

METHOD FOR RECORDING AND REPRODUCING A RADIATION IMAGE, APPARATUS USING SAID METHOD, PANEL FOR STORING THE RADIATION IMAGE AND PHOTOSTIMULABLE PHOSPHOR

FIELD OF THE INVENTION

This invention refers to a method for recording and reproducing a radiation image by causing a visible radiation stimulable phosphor to absorb high-energy radiation after passing through an object, stimulating said phosphor to release the stored energy as fluorescent light and detecting said fluorescent light, the photostimulable phosphor being a green emitting terbium activated alkali metal tantalate, doped with at least one metal selected in the group consisting of Mg, Ca, Sr, Ba, Al, Ga, Ge, Pb, Bi, transition elements and lanthanides.

BACKGROUND OF THE ART

U.S. Pat. No. 3.859,527 describes a method for recording and reproducing a high-energy radiation image using a panel for storing a radiation image comprising a stimulable phosphor which emits light when stimulated with visible or infrared radiations after exposure to such radiation (wherein high-energy radiation means an electromagnetic wave or corpuscular radiation such as X-rays, α-rays, β-rays, γ-rays, neutrons, ultraviolet rays, or the like).

U.S. Pat. No. 4,258,264 describes a method and apparatus for reproducing a radiation image by stimulating a storing phosphor with stimulating rays, the wavelengths of which are in the range from 600 to 700 nm, and detecting the stimulated light by means of a light detector, the detected light being in the range from 300 to 500 nm.

EP 111,893 describes a method for recording and reproducing a radiation image comprising the steps of (i) causing a radiation image storing panel to absorb a radiation after passing through an object, such a panel containing a divalent europium activated barium fluorochloride phosphor, (ii) exposing said panel to an electromagnetic wave having a wavelength in the range from 400 to 550 nm to release the stored radiation energy as fluorescent light and (iii) detecting said fluorescent light.

EP 435,241 describes a phosphor for direct X-ray intensifying screen to be used in combination with a radiographic film comprising a mixture of europium doped barium fluorohalide and niobium doped yttrium metal tantalate.

EP 299,409 describes a radiographic intensifying screen to be used in combination with a radiographic film for direct radiography. The claimed phosphor comprises a mixture of a terbium activated rare earth oxysulfide phosphor and a terbium activated rare earth tantalate complex oxide phosphor.

JP 02/47,185 (1990) describes a method of preparation of a terbium activated rare earth tantalate complex oxide of formula:

$$(L_{1-n}Tb_n)_2O_3 \cdot xTa_2O_5 \cdot yB_2O_3 \cdot zNaF$$

wherein L is Y, La, Gd or Lu, n=0.005-0.1, x=0.95-1.05, y=0-5.0 and z is a number in order to have up to 0.52% by weight of NaF.

None of the above patent references relating to stimulable phosphors suggests the use of the terbium activated alkali metal tantalates of the present invention in order to obtain a green emitting photostimulable phosphor useful in a method similar to that described in the U.S. Pat. No. 3,859,527 and 4,239,968.

SUMMARY OF THE INVENTION

The present invention relates to new phosphors for use in panels, apparatus and methods for recording and reproducing a high energy radiation image, including the steps of stimulating a phosphor image-wise exposed to radiation and detecting the fluorescent light emitted by said phosphor upon stimulation, said phosphor being a green emitting terbium activated alkali metal tantalate, doped with at least one element selected in the group consisting of Mg, Ca, Sr, Ba, Al, Ga, Ge, Pb, Bi, transition elements and lanthanides.

DETAILED DESCRIPTION OF THE INVENTION

The present invention relates to a method for recording and reproducing a radiation image comprising the steps of (i) causing a visible or infrared radiation-stimulable phosphor to absorb high energy radiation after passing through an object, (ii) stimulating said phosphor with visible or infrared radiation to release the energy stored as fluorescent light and (iii) detecting said fluorescent light with light detecting means, said method being characterized in that said phosphor is a green emitting terbium activated alkali metal tantalate, doped with at least one element selected in the group consisting of Mg, Ca, Sr, Ba, Al, Ga, Ge, Pb, Bi, transition elements and lanthanides.

Preferably, the present invention relates to a method as described above wherein said phosphor is represented by the following general formula:

$$Li_{1-x}A_xTaO_3 \cdot yMe:zTb$$

wherein A is an alkali metal selected in the group consisting of Na, K, Rb and Ce; Me is at least one metal selected in the group consisting of Mg, Ca, Sr, Ba, Al, Ga, Ge, Pb, Bi, transition elements and lanthanides, and x, y and z are numbers satisfying the conditions $0 \leq x < 1$, $0 \leq y < 0.1$ and $0 < z \leq 0.1$.

More preferably, the present invention relates to a method as described above wherein said phosphor is represented by the following general formula:

$$Li_{1-x}A_xTaO_3 \cdot yMe:zTb$$

wherein A is an alkali metal selected in the group consisting of Na, K, Rb and Ce; Me is at least one metal selected in the group consisting of Mg, Ca, Sr, Ba, Al, Ga, Ge, Pb, Bi, Zr, W, Zn, Sin, Eu, and Gd, and x, y and z are numbers satisfying the conditions $0 \leq x < 1$, $0 \leq y < 0.05$ and $0 < z < 0.01$.

In particular, the present invention relates to the method described above wherein the wavelength of said stimulating radiation is in the range of from 400 to 1100 nm.

In a preferred embodiment of the method of the present invention the wavelength of said stimulating radiation ranges from 600 to 800 nm, more preferably in the range of from 600 to 650 nm and of from 750 to 800 nm.

In another preferred embodiment of the method of the present invention the wavelength of said stimulating radiation ranges from 400 to 500 nm.

The method described above is further characterized in that said fluorescent light emitted by the above mentioned phosphor has a wavelength higher than 500 nm, preferably in the range of from 500 to 600 nm.

In another aspect, the present invention relates to an apparatus for recording and reproducing a radiation image comprising (i) means for causing a visible or infrared radiation-stimulable phosphor to absorb high energy radiation after passing through an object, (ii) means for stimulating said phosphor with visible or infrared stimulating radiation to release the energy stored as fluorescent light and (iii) means for detecting said fluorescent light, said apparatus being characterized in that said phosphor is a green emitting terbium activated alkali metal tantalate, doped with at least one element selected in the group consisting of Mg, Ca, Sr, Ba, Al, Ga, Ge, Pb, Bi, transition elements and lanthanides.

In a further aspect, the present invention relates to a high energy radiation image storage panel having a fluorescent layer comprising a binder and a stimulable phosphor dispersed in said binder, wherein said stimulable phosphor is a green emitting terbium activated alkali metal tantalate, doped with at least one element selected in the group consisting of Mg, Ca, Sr, Ba, Al, Ga, Ge, Pb, Bi, transition elements and lanthanides.

In a still further aspect, the present invention relates to a green emitting terbium activated alkali metal tantalate, doped with at least one element selected in the group consisting of Mg, Ca, Sr, Ba, Al, Ga, Ge, Pb, Bi, transition elements and lanthanides.

The method and the apparatus for recording and reproducing a high energy radiation image using the radiation image storage panel of the present invention schematically comprise: a high energy radiation source, an object, a radiation image storage panel, a light source emitting stimulating radiation which stimulates the fluorescent layer of the panel to release the radiation energy stored therein as fluorescent light, a filter for cutting off the radiation emitted by the light source and reflected by the panel at a selected wavelength and for transmitting only the fluorescent light emitted by the panel, and a focusing optical element for collecting the light emitted by the panel and passed through the filter. The combination of a photosensor with a photomultiplier is used to detect and convert the light emitted by the panel into electrical signals, the electrical signal being amplified by means of an amplifier and said amplified electrical signal being analyzed by a data analyzer.

Means for causing a visible or infrared radiation-stimulable phosphor to absorb high energy radiation after passing through an object are known in the art, as described in U.S. Pat. No. 4,239,968. These means include a high energy radiation source (such as e.g. an X-ray tube) and a radiation image storage panel similar to that of the present invention including a phosphor different from those of the present invention. When the phosphor is exposed to X-rays, the radiation passes through the object. The intensity of the radiation after passing through the object represents the transmittance factor of the object. An image which represents the transmittance pattern of the object is obtained by means of the radiation impinging upon the panel. The radiation is absorbed by the fluorescent layer of the panel and electrons or holes are generated in the fluorescent layer in proportion to the amount of the absorbed radiation. The electrons or holes are stored in the traps of the phosphors of the present invention. The radiation image stored in the panel is converted to visible radiation upon stimulation with a stimulating radiation source, especially a beam. Means for stimulating said panel with visible or infrared radiations are known in the art to include stimulating radiation sources emitting in the infrared or visible field, such as for example, an Osram QJ Lamp provided by suitable optical filters emitting at 800 nm, a He—Ne laser emitting a laser beam at 633 nm, as described in US patent 4,239,968, and a laser emitting at 488 nm. Stimulation radiation sources having a wavelength of 633 and 800 nm, that is a wavelength longer than the wavelength of the phosphor emission are preferred, although good results are obtained also with stimulation at 400 or 488 nm, that is a wavelength shorter than the wavelength of the phosphor emission. A scanner apparatus allows the fluorescent layer of the panel to be scanned with stimulating radiation emitted by a light source, as described in U.S. Pat. No. 4,258,264. Focusing means allow said stimulating light to be focused on the panel in a small spot (such as 0.7 mm$^2$), as described in U.S. Pat. No. 4,258,264. The electrons or holes stored in the traps of the photostimulable phosphors are expelled therefrom, and the radiation image stored in the panel is released as fluorescent light.

The luminescence of the fluorescent light emitted by the panel is proportional to the number of the electrons or holes stored in the fluorescent layer of the panel, that is, proportional to the amount of the radiation absorbed therein.

Means for detecting said fluorescent light emitted by the panel are known in the art to include: (a) interference filter means, whose transmission peak is tuned to the wavelength of the signal emitted by the sample to filter-out the unwanted stimulating light (such as e.g. a BG1 or BG3 Schott filter); (b) optical means to collect the light emitted by the panel such as for example light guide members having a linear or arcuate end portion to be located adjacent to a scan line of the photostimulable phosphor to receive and guide the light emitted by the phosphor and an annular end portion to be located adjacent to the light receiving face of the photodetector, such as described in U.S. Pat. No. 4,346,295. Useful optical means to collect the light emitted by the panel are also represented by elliptical mirrors having the concave side turned towards the panel and on opening for the passage of said stimulating radiation, as described in European Patent Application S.N. 210,505; (c) the combination of a photosensor with a photomultiplier to detect and convert the fluorescent light into electrical signals (such as e.g. a Thorn Emi 9635 QB photomultiplier); (d) a picoammeter for the amplification of the signal (such as e.g. an EG&G Parc Model 181 amplifier) and (e) evaluation means to evaluate the obtained electrical signal (corresponding to the original high energy radiation image), such as e.g. a data analyzer.

The radiation image storage panel of the above described apparatus has a fluorescent layer comprising, as a stimulable phosphor, at least one green emitting terbium activated alkali metal tantalate, doped with at least one element selected in the group consisting of Mg, Ca, Sr, Ba, Al, Ga, Ge, Pb, Bi, transition elements and lanthanides.

The storage capability of tile phosphors of the present invention, as a preliminary hypothesis, is believed to be due to the hole trapping at $Tb^{3+}$ sites and to electron trapping capability of the doping metals (such as W, Mo, and the like) or at anionic vacancies (F+ centers) promoted by the doping metal itself. It is worth noting that depending on tile site occupied by the doping metal, that is alkali metal or tantalum sites, cationic and/or anionic vacancies can be created. Although special measurements are required to verify the substituted site, we can assume that cationic vacancies will act as hole trapping, like $Tb^{3+}$ ion do, contributing thus to increase the storage efficiency. On the other hand, formation of electron trapping anionic vacancies increases the storage efficiency as well.

Summarizing, the different trapping centers that could act in the storage phosphor of the present invention could be: $Tb^{3+}$ ions and cationic vacancies at Li+ and/or $Ta^{5+}$ sites, for trapping holes, and oxygen vacancies (F+ centers), supervalent lithium substituted sites, reductable dopant metal ions (such as, for example, $W^{6+}$, $Mo^{6+}$, and the like), for trapping electrons. The electrons and, probably, holes released from traps other than $Tb^{3+}$ will migrate in the lattice till recombination at $Tb^{3+}$ sites, which will be stimulated to emit luminescence.

In particular, the radiation image storage panel of the apparatus above has a fluorescent layer comprising, as a stimulable phosphor, at least one phosphor represented by the formula:

$$Li_{1-x}A_xTaO_3 \cdot yMe:zTb$$

wherein A is an alkali metal selected in the group consisting of Na, K, Rb and Ce; Me is at least one metal selected in the group consisting of Mg, Ca, Sr, Ba, Al, Ga, Ge, Pb, Bi, transition elements and lanthanides, and x, y and z are numbers satisfying the conditions $0 \leq x < 1$, $0 \leq y < 0.1$ and $0 < z \leq 0.1$.

More preferably, the radiation image storage panel of the apparatus above has a fluorescent layer comprising, as a stimulable phosphor, at least one phosphor represented by the formula:

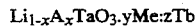

$$Li_{1-x}A_xTaO_3 \cdot yMe:zTb$$

wherein A is an alkali metal selected in the group consisting of Na, K, Rb and Ce; Me is at least one metal selected in the group consisting of Mg, Ca, Sr, Ba, Al, Ga, Ge, Pb, Bi, Zr, W, Zn, Sm, Eu, and Gd, and x, y and z are numbers satisfying the conditions $0 \leq x < 1$, $0 \leq y < 0.05$ and $0 < z \leq 0.01$.

The phosphor of the present invention, as defined in the above general formula, is characterized in that the fluorescent light emitted upon stimulation by electromagnetic radiation has a wavelength higher than 500 nm, preferably in the range of from 500 to 600 nm.

Furthermore, it has been found that the fluorescent light emitted by the stimulable phosphors of the present invention tends to reach a maximum when stimulated by electromagnetic radiation having wavelength in the range from 400 to 1100 nm, preferably of from 600 to 800 nm and of from 400 to 500 nm.

The above mentioned phosphors of the present invention are thermally processed.

Such thermal processing can be performed according to any method known in the art. According to a preferred embodiment such thermal processing includes mixing the components, which can be performed in presence of an organic liquid such as acetone, ethanol, and the like, drying, at a temperature of from 100° C. to 200° C., for about 10-20 hours, and firing, which can be performed in the presence of a salt acting as a "flux" (such as ammonium chloride, sodium carbonate, and the like), at a temperature in the range of from 800° to 1500° C., preferably 1000° to 1300° C., and cooling at room temperature before tile obtained phosphors are repeatedly washed with water to be purified. Heating can be performed with a mechanical mixture of the reagents in a crucible in the air or inert gas atmosphere, e.g. argon, for a time ranging from 1 to 30, preferably from 1 to 10 hours.

The radiation image storage panels of the present invention normally comprise a fluorescent layer including a binder and, dispersed therein, at least one phosphor of the present invention. The fluorescent layer is formed by dispersing the phosphor in the binder to prepare a coating dispersion, and then applying the coating dispersion according to conventional coating methods to form a uniform layer. Although the fluorescent layer itself can be a radiation image storage panel when the fluorescent layer is self-supporting, the fluorescent layer is generally provided on a substrate to form a radiation image storage panel. Further, a protective layer is usually provided on the surface of the fluorescent layer for physically and chemically protecting the fluorescent layer. Furthermore, a primer layer is sometimes provided between the fluorescent layer and the substrate for closely binding the fluorescent layer to the substrate.

As the binder employed in the fluorescent layer of the radiation image storage panel of the present invention, there can be used for example those binders commonly used for forming layers, such as arabic gum, proteins such as gelatin, polysaccharides such as dextrane, organic polymer binders such as polyvinylbutyral, polyvinylacetate, nitrocellulose, ethylcellulose, vinylidene-chloride-vinylchloride copolymers, polymethyl-methacrylate, polybutylmethacrylate, vinylchloride-vinylacetate copoly-mers, polyurethane, cellulose acetate-butyrate, polyvinyl alcohol, and the like.

Generally, the binder is used in an amount of 0.01 to 1 part by weight per one part by weight of the phosphor. However, from the viewpoint of sensitivity and sharpness of the panel obtained, the amount of the binder should preferably be small. Accordingly, in consideration of both the sensitivity and sharpness of the panel and the easiness of application of the coating dispersion, the binder is preferably used in an amount of 0.03 to 0.2 pads by weight per one part by weight of the stimulable phosphor. The thickness of the fluorescent layer is generally within the range of 10 μm to 1 mm.

In the radiation image storage panel of the present invention, the fluorescent layer is generally coated on a substrate. As the substrate, various materials such as polymer material, glass, wool, cotton, paper, metal, or the like can be used. From the viewpoint of handling the panel as an information recording medium, the substrate should preferably be processed into a sheet or flexible roll. In this connection, as the substrate is preferable an organic polymeric film such as a cellulose acetate film, polyester film, polyethylene-terephthalate film, polyamide film, triacetate film, polycarbonate film, or the like, or ordinary paper, or processed paper such as a photographic paper, baryta paper, resin-coated paper, paper which contains a pigment such as titanium dioxide, or the like. The substrate may have a primer layer on one surface thereof (the surface on which the fluorescent layer is provided) for the purpose of holding the fluorescent layer tightly. As the material of the primer layer, an ordinary adhesive can be used. In providing a fluorescent layer on the substrate or on the primer layer, a coating dispersion comprising the phosphor dispersed in a binder may be directly applied to the substrate or to the primer layer to form the fluorescent layer. Alternatively, a fluorescent layer formed beforehand may be bound to the substrate or to the primer. Where the substrate used is permeable to the stimulating radiations of the phosphor, the radiation image storage panel can be exposed to the stimulating radiation from the substrate side.

Further, in the radiation image storage panel of the present invention, a protective layer for physically and chemically protecting the fluorescent layer is generally provided on the surface of the fluorescent layer intended for exposure (on the side opposite the substrate). When, as mentioned above, the fluorescent layer is self-supporting, the protective layer may be provided on both surfaces of the fluorescent layer. The protective layer may be provided on the fluorescent layer by directly applying thereto a coating dispersion to form the protective layer thereon, or may be provided thereon by bonding thereto the protective layer formed beforehand. As the material of the protective layer, a conventional material for a protective layer such as nitrocellulose, ethylcellulose, cellulose acetate, polyester, polyethylene-terephthalate, and the like can be used.

The radiation image storage panel of the present invention may be colored with a colorant. Further, the fluorescent layer on the radiation image storage panel of the present invention may contain a white powder dispersed therein. By using a colorant or a white powder, a radiation image storage panel which provides a very sharp image can be obtained.

The present invention will be described with more details referring to the following examples.

Approximations in expressions of the numerical values which indicate the molar fractions are the cause of approximation in the numerical value expressing the sum thereof (in some cases 0.9999—,in other cases 0.9998 ,—rather than 1.0000).

PREPARATION OF PHOSPHORS

EXAMPLE 1

Preparation of $LiTaO_3$.Tb Compound 1 of Table 1

A mixture consisting of 8.00 g of $Ta_2O_5$, and 9.00 g of $LiSO_4$ and 0.010 g of $Tb_4O_7$ were mixed in presence of acetone. The mixture was dried at 170° C. for about 15 hours, and then fired 8 hours at 1200° C. in air. The obtained phosphor was then left to cool in the air to room temperature, pulverized, sieved in cold water and dried at 150° C.

Preparation of $LiTaO_3(Bi)$.Tb Compound 2 of Table 1

A mixture consisting of 8.00 g of $Ta_2O_5$, 9.00 g of $LiSO_4$, 0.010 g of $Tb_4O_7$ and 0.001 g of $Bi_2O_3$ were mixed in presence of acetone. The mixture was dried at 170° C. for about 15 hours, and then fired 8 hours at 1200° C. in air. The obtained phosphor was then left to cool in the air to room temperature, pulverized, sieved in cold water and dried at 150° C.

Compound 3 was prepared in a similar way by employing 0.01 g of $Bi_2O_3$.

Preparation of $LiTaO_3(Pb)$.Tb Compound 4 of Table 1

A mixture consisting of 8.00 g of $Ta_2O_5$, 9.00 g of $LiSO_4$, 0.010 g of $Tb_4O_7$ and 0.005 g of PbO were mixed in presence of acetone. The mixture was dried at 170° C. for about 15 hours, and then fired 8 hours at 1200° C. in air. The obtained phosphor was then left to cool in the air to room temperature, pulverized, sieved in cold water and dried at 150° C..

Compound 5 was prepared in a similar way by employing 0.005 g of $GeO_2$.

Preparation of $LiTaO_3(Al)$.Tb Compound 6 of Table 1

A mixture consisting of 8.00 g of $Ta_2O_5$, 9.00 g of $LiSO_4$, 0.010 g of $Tb_4O_7$ and 0.01 g of $Al_2O_5$ were mixed in presence of acetone. The mixture was dried at 170° C. for about 15 hours, and then fired 8 hours at 1200° C. in air. The obtained phosphor was then left to cool in the air to room temperature, pulverized, sieved in cold water and dried at 150° C.

Compounds 7 and 8 were prepared in a similar way by employing 0.01 and 0.1 g of $Ga_2O_3$, respectively.

Preparation of $LiTaO_3(Zr)$.Tb Compound 9 of Table 1

A mixture consisting of 8.00 g of $Ta_2O_5$, 9.00 g of $LiSO_4$, 0.010 g of $Tb_4O_7$ and 0.006 g of $ZrO_2$ were mixed in presence of acetone. The mixture was dried at 170° C. for about 15 hours, and then fired 8 hours at 1200° C. in air. The obtained phosphor was then left to cool in the air to room temperature, pulverized, sieved in cold water and dried at 150° C.

Preparation of $LiTaO_3(W)$.Tb Compound 10 of Table 1

A mixture consisting of 8.00 g of $Ta_2O_5$, 9.00 g of $LiSO_4$, 0.010 g of $Tb_4O_7$ and 0.005 g of $WO_3$ were mixed in presence of acetone. The mixture was dried at 170° C. for about 15 hours, and then fired 8 hours at 1200° C. in air. The obtained phosphor was then left to cool in the air to room temperature, pulverized, sieved in cold water and dried at 150° C.

Compound 11 was prepared in a similar way by employing 0.1 g of $WO_3$.

Preparation of $LiTaO_3(Zn)$.Tb Compound 12 of Table 1

A mixture consisting of 8.00 g of $Ta_2O_5$, 9.00 g of $LiSO_4$, 0.010 g of $Tb_4O_7$ and 0.01 g of ZnO were mixed in presence of acetone. The mixture was dried at 170° C. for about 15 hours, and then fired 8 hours at 1200° C. in air. The obtained phosphor was then left to cool in the air to room temperature, pulverized, sieved in cold water and dried at 150° C.

Compounds 13 and 14 were prepared in a similar way by employing 0.03 and 0.1 g of ZnO, respectively.

Preparation of $LiTaO_3(Mg)$.Tb Compound 15 of Table 1

A mixture consisting of 8.00 g of $Ta_2O_5$, 9.00 g of $LiSO_4$, 0.010 g of $Tb_4O_7$ and 0.06 g of $MgSO_4$ were mixed in presence of acetone. The mixture was dried at 170° C. for about 15 hours, and then fired 8 hours at 1200° C. in air. The obtained phosphor was then left to cool in the air to room temperature, pulverized, sieved in cold water and dried at 150° C.

Compounds 16 and 17 were prepared in a similar way by employing 0.1 and 0.2 g of $MgSO_4$, respectively.

Compounds 18, 19 and 20 were prepared in a similar way by employing 0.007, 0.07 and 0.2 g of $CaSO_4$, respectively.

Compounds 21, 22 and 23 were prepared in a similar way by employing 0.0009, 0.009 and 0.09 g of $SrSO_4$, respectively.

Compound 24 was prepared in a similar way by employing 0.12 g of BaSO$_4$.

Preparation of LiTaO$_3$(Eu).Tb Compound 25 of Table 1

A mixture consisting of 8.00 g of Ta$_2$O$_5$, 9.00 g of LiSO$_4$, 0.009 g of Tb$_4$O$_7$ and 0.00025 g of Eu$_2$O$_3$ were mixed in presence of acetone. The mixture was dried at 170° C. for about 15 hours, and then fired 8 hours at 1200° C. in air. The obtained phosphor was then left to cool in the air to room temperature, pulverized, sieved in cold water and dried at 150° C.

Compounds 26, 27, 28 and 29 were prepared in a similar way by employing 0.0005, 0.001, 0.002 and 0.004 g of Eu$_2$O$_3$, respectively.

Compounds 30 and 31 were prepared in a similar way by employing 0.0005 g and 0.002 g of Sm$_2$O$_3$, respectively.

Compounds 32 and 33 were prepared in a similar way by employing 0.001 g and 0.01 g of Gd$_2$O$_3$, respectively.

TABLE 1

| Phosphor Sample | Formula |
| --- | --- |
| 1 | LiTaO$_3$.Tb$_{0.00148}$ |
| 2 | LiTaO$_3$(Bi$_{0.0001}$).Tb$_{0.00148}$ |
| 3 | LiTaO$_3$(Bi$_{0.0012}$).Tb$_{0.00148}$ |
| 4 | LiTaO$_3$(Pb$_{0.0006}$).Tb$_{0.00148}$ |
| 5 | LiTaO$_3$(Ge$_{0.0013}$).Tb$_{0.00148}$ |
| 6 | LiTaO$_3$(Al$_{0.0054}$).Tb$_{0.00148}$ |
| 7 | LiTaO$_3$(Ga$_{0.0029}$).Tb$_{0.00148}$ |
| 8 | LiTaO$_3$(Ga$_{2.0295}$).Tb$_{0.00148}$ |
| 9 | LiTaO$_3$(Zr$_{0.0013}$).Tb$_{0.00148}$ |
| 10 | LiTaO$_3$(W$_{0.0006}$).Tb$_{0.00148}$ |
| 11 | LiTaO$_3$(W$_{0.0119}$).Tb$_{0.00148}$ |
| 12 | LiTaO$_3$(Zn$_{0.0034}$).Tb$_{0.00148}$ |
| 13 | LiTaO$_3$(Zn$_{0.100}$).Tb$_{0.00148}$ |
| 14 | LiTaO$_3$(Zn$_{0.0339}$).Tb$_{0.00148}$ |
| 15 | LiTaO$_3$(Mg$_{0.0137}$).Tb$_{0.00148}$ |
| 16 | LiTaO$_3$(Mg$_{0.0229}$).Tb$_{0.00148}$ |
| 17 | LiTaO$_3$(Mg$_{0.0459}$).Tb$_{0.00148}$ |
| 18 | LiTaO$_3$(Ca$_{0.0014}$).Tb$_{0.00148}$ |
| 19 | LiTaO$_3$(Ca$_{0.0140}$).Tb$_{0.00148}$ |
| 20 | LiTaO$_3$(Ca$_{0.0400}$).Tb$_{0.00148}$ |
| 21 | LiTaO$_3$(Sr$_{0.0001}$).Tb$_{0.00148}$ |
| 22 | LiTaO$_3$(Sr$_{0.0013}$).Tb$_{0.00148}$ |
| 23 | LiTaO$_3$(Sr$_{0.0135}$).Tb$_{0.00148}$ |
| 24 | LiTaO$_3$(Ba$_{0.0142}$).Tb$_{0.00148}$ |
| 25 | LiTaO$_3$(Eu$_{0.00004}$).Tb$_{0.00135}$ |
| 26 | LiTaO$_3$(Eu$_{0.0001}$).Tb$_{0.00135}$ |
| 27 | LiTaO$_3$(Eu$_{0.0002}$).Tb$_{0.00135}$ |
| 28 | LiTaO$_3$(Eu$_{0.0003}$).Tb$_{0.00135}$ |
| 29 | LiTaO$_3$(Eu$_{0.0006}$).Tb$_{0.00135}$ |
| 30 | LiTaO$_3$(Sm$_{0.0001}$).Tb$_{0.00135}$ |
| 31 | LiTaO$_3$(Sm$_{0.0003}$).Tb$_{0.00135}$ |
| 32 | LiTaO$_3$(Gd$_{0.0001}$).Tb$_{0.00135}$ |
| 33 | LiTaO$_3$(Gd$_{0.0015}$).Tb$_{0.00135}$ |

PHOSPHOR EVALUATION

EXAMPLE 2

Samples of phosphors of Table 1 were exposed to 40 KVp and 10 mA X-ray radiation for 10 seconds. After 2 minutes they were then stimulated with a 633 nm light beam obtained by causing the light to be emitted by a QJ lamp passing through a Melles-Griot type FIL026 filter. The light collection filters were two Melles-Griot type FIV044 and SWP015. The light power was 0.017 $\mu$W/cm$^2$ as measured by a EG&G Parc Model 450 radiometer. Stimulation was performed for 60 seconds by using a Programmable Shutter Supply (Ealong). Photostimulated light emitted by the phosphor was collected by a photomultiplier (Emi Thorn 9635 QB type) and converted into electrical signals.

The electrical signal was amplified by the combination of an EG&G Parc Model 181 pre-amplifier and an EG&G Parc Model 113 amplifier. The signal was then evaluated by a Data Precision 6000, Division Analogic Corp., data analyzer.

EXAMPLE 3

Samples of phosphors of table 1 were exposed to X-ray radiations as described in Example 2, with the only difference being that the phosphors were stimulated with a 800 nm light beam obtained from a QJ Lamp (Osram, HLX-64625-FCR) and passed through Melles-Griot type FIL007 plus FIL015 and Schott RG850 filters. The light power was 0.2 $\mu$W/cm$^2$ measured as above.

EXAMPLE 4

Samples of phosphors of table 1 were exposed to X-ray radia-tions as described in Example 2, with the only difference being that the phosphors were stimulated with a 400 nm light beam obtained from a QJ Lamp (Osram HLX-64625-FCR) and passed through a Melles-Griot type FIV026. The light collection filter was a Melles-Griot type FIV044 and SWP015. The light power was 0.2 $\mu$W/cm$^2$ measured as above.

EXAMPLE 5

Samples of phosphors of table 1 were exposed to X-ray radiations as described in Example 2, with the only difference being that the phosphors were stimulated with a 488 nm light beam obtained by causing the light to be emitted by a Spectra Physics Laser 165 passing through a Melles-Griot type FIL002 filter plus two Gray type FNQ 007 and 015 filters. The light collection filter was a Melles-Griot type FIV044. The light power was 0.2 $\mu$W/cm$^2$ measured as above.

EXAMPLE 6

The following Table 2 reports the photostimulated emitted light emission values of the phosphors of table 1 and processed as described in Examples 2 and 3.

In Table 2, the emission efficiency value of the reference phosphor (compound 1) has been normalized to 100 for each stimulation at 633 and 800 nm. This does not mean that the emission efficiency value of such phosphor when stimulated at 633 nm is equal to the emission efficiency value of the same phosphor when stimulated at 800 nm.

TABLE 2

| | Emission efficiency | |
| --- | --- | --- |
| Sample | 633 nm | 800 nm |
| 1 | 100 | 100 |
| 2 | 102 | 103 |
| 3 | 110 | 117 |
| 4 | 123 | — |
| 5 | 145 | — |
| 6 | 115 | 138 |
| 7 | 120 | — |
| 8 | 180 | 169 |
| 9 | 115 | 95 |
| 10 | 350 | 317 |
| 11 | 375 | 220 |
| 12 | 209 | 270 |
| 13 | 187 | — |
| 14 | 131 | 111 |
| 15 | 257 | 244 |
| 16 | 245 | 232 |
| 17 | 245 | 230 |

TABLE 2-continued

| Sample | Emission efficiency | |
|---|---|---|
| | 633 nm | 800 nm |
| 18 | 145 | 110 |
| 19 | 223 | 170 |
| 20 | 129 | 80 |
| 21 | 130 | 149 |
| 22 | 123 | 132 |
| 23 | 121 | 132 |
| 24 | 195 | 120 |
| 25 | 338 | 680 |
| 26 | — | 666 |
| 27 | 278 | 600 |
| 28 | — | 854 |
| 29 | — | 319 |
| 30 | 165 | 80 |
| 31 | 186 | 125 |
| 32 | 112 | 111 |
| 33 | 110 | 117 |

The data of table 2 clearly show the improvement of the emission efficiency of the litium tantalate activated with terbium when doped with a metal of the present invention.

EXAMPLE 7

The following Table 3 reports the photostimulated emitted light emission values of some phosphors of table 1 and processed as described in Examples 4 and 5.

In Table 3, the emission efficiency value of the reference phosphor (compound 1) has been normalized to 100 for each stimulation at 400 and 488 nm. This does not mean that the emission efficiency value of such phosphor when stimulated at 400 nm is equal to the emission efficiency value of the same phosphor when stimulated at 488 nm.

TABLE 3

| Sample | Emission efficiency | |
|---|---|---|
| | 400 nm | 488 nm |
| 1 | 100 | 100 |
| 11 | 110 | — |
| 13 | 160 | — |
| 14 | 196 | — |
| 15 | 83 | 200 |
| 30 | 135 | — |

EXAMPLE 8

A mixture consisting of 8.00 g of $Ta_2O_5$ and 0.010 g of $Tb_4O_7$ were mixed with the ingredients of table 4 in presence of acetone. The mixture was dried at 170° C. for about 15 hours, and then fired 8 hours at 1200° C. in air. The obtained phosphors were then left to cool in the air to room temperature, pulverized, sieved in cold water and dried at 150° C.

TABLE 4

| Phosphor | $Li_2SO_4$ | $Na_2SO_4$ | $K_2SO_4$ | $Rb_2SO_4$ |
|---|---|---|---|---|
| 33 | 9.000 | — | — | — |
| 34 | 8.900 | 0.100 | — | — |
| 35 | 8.000 | 1.000 | — | — |
| 36 | 4.000 | 5.000 | — | — |
| 37 | 8.900 | — | 0.100 | — |
| 38 | 8.000 | — | 1.000 | — |
| 39 | 4.000 | — | 5.000 | — |
| 40 | 9.000 | — | — | 1.350 |

Samples of phosphors of table 4 were exposed to X-ray radiations as described in Example 2. The following table 5 reports the photostimulated emitted light emission value of the phosphors of table 4 when processed according to Example 2.

TABLE 5

| Phosphor | Emission Efficiency at 633 nm stim. ray |
|---|---|
| 33 | 100 |
| 34 | 172 |
| 35 | 140 |
| 36 | 18 |
| 37 | 173 |
| 38 | 200 |
| 39 | 9 |
| 40 | 111 |

The results of table 5 clearly show that the substitution of lithium with small amounts of other alkaline metals improves the emission efficiency of the phosphors of the present invention. On the other hand, when the substitution exceeds a 1:1 weight ratio, the emission efficiency is reduced.

I claim:
1. A method for recording and reproducing a radiation image comprising the steps of (i) causing a visible or infrared radiation stimulable phosphor to absorb a high energy radiation which has passed through an object, (ii) stimulating said phosphor with visible or infrared radiation to release energy stored as fluorescent light, and (iii) detecting said fluorescent light with light detecting means, characterized in that said phosphor is a green emitting terbium activated alkali metal tantalate, wherein said phosphor is represented by the following general formula:

$Li_{1-x}A_xTaO_3 \cdot yMe:zTb$ wherein A is an element selected from the group consisting of Na, K, Rb, and Ce; Me is at least one metal selected from the group consisting of Mg, Ca, Sr, Ba, Al, Ga, Ge, Pb, Bi transition elements and lanthanides, and x, y and z are numbers satisfying the conditions $0 \leq x < 1$, $0 \leq y < 0.1$, and $0 < z \leq 0.1$.

2. The method for recording and reproducing a radiation image of claim 1, wherein said phosphor is represented by the following general formula:

$Li_{1-x}A_xTaO_3 \cdot yMe:zTb$ wherein A is an element selected in the group consisting of Na, K, Rb and Ce; Me is at least one metal selected in the group consisting of Mg, Ca, Sr, Ba, Al, Ga, Ge, Pb, Bi, Zr, W, Zn, Sm, Eu, and Gd, and x, y and z are number satisfying the conditions $0 \leq x < 1$, $0 \leq y < 0.05$ and $0 < z \leq 0.01$.

3. The method for recording and reproducing a radiation image of claim 1, wherein said phosphor is stimulated with a radiation having a wavelength in the range of from 400 to 1100 nm.

4. The method for recording and reproducing a radiation image of claim 1, wherein said phosphor is stimulated with a radiation having a wavelength in the range of from 400 to 500 nm.

5. The method for recording and reproducing a radiation image of claim 1, wherein said phosphor is stimulated with a radiation having a wavelength in the range of from 600 to 800 nm.

6. The method for recording and reproducing a radiation image of claim 1, wherein said phosphor emits a fluorescent light having a wavelength higher than 500 nm.

7. The method for recording and reproducing a radiation image of claim 1, wherein said phosphor emits a fluorescent light having a wavelength of from 500 to 600 nm.

8. A radiation image storage panel having a fluorescent layer comprising a binder and a stimulable phosphor dispersed in said binder characterized in that said phosphor is a green emitting terbium activated alkali metal tantalate, wherein said phosphor is represented by the following general formula:

$$Li_{1-x}A_xTaO_3 \cdot yMe:zTb$$

wherein A is an element selected from the group consisting of Na, K, Rb and Ce; Me is at least one metal selected from the group consisting of Mg, Ca, Sr, Ba, Al, Ga, Ge, Pb, Bi, transition elements and lanthanides, and x, y, and z are numbers satisfying the conditions $0 \leq x < 1$, $0 \leq y < 0.1$ and $0 < z \leq 0.1$ 9. The radiation image storage panel of claim 8, wherein said phosphor is represented by the following general formula:

$$Li_{1-x}A_xTaO_3 \cdot yMe:zTb$$

wherein A is an element selected in the group consisting of Na, K, Rb and Ce; Me is at least one metal selected in the group consisting of Mg, Ca, Sr, Ba, Al, Ga, Ge, Pb, Bi, Zr, W, Zn, Sim, Eu, and Gd, and x, y and z are numbers satisfying the conditions $0 \leq x < 1$, $0 \leq y < 0.05$ and $0 < z \leq 0.01$.

10. A photostimulable green emitting terbium activated alkali metal tantalate phosphor, wherein said phosphor is represented by the following general formula:

$$Li_{1-x}A_xTaO_3 \cdot yMe:zTb$$

wherein A is an element selected from the group consisting of Na, K, Rb and Ce; Me is at least one metal selected from the group consisting of Mg, Ca, Sr, Ba, Al, Ga, Ge, Pb, Bi, transition elements and lanthanides, and x, y, and z are numbers satisfying the conditions $0 \leq x < 1$, $0 \leq y < 0.1$ and $0 < z \leq 0.1$.

11. The photostimulable phosphor of claim 10, wherein said phosphor is represented by the following general formula $$Li_{1-x}A_xTaO_3 \cdot yMe:zTb$$

wherein A is an element selected in the group consisting of Na, K, Rb and Ce; Me is at least one metal selected in the group consisting of Mg, Ca, Sr, Ba, Al, Ga, Ge, Pb, Bi, Zr, W, Zn, Sm, Eu, and Gd, and x, y and z are numbers satisfying the conditions $0 \leq x < 1$, $0 \leq y < 0.05$ and $0 < z \leq 0.01$.

12. The photostimulable phosphor of claim 11, wherein said phosphor emits a fluorescent light having a wavelength higher than 500 nm.

13. The photostimulable phosphor of claim 10, wherein said phosphor emits a fluorescent light having a wavelength of from 500 to 600 nm.

14. An apparatus for recording and reproducing a radiation image comprising (1) means for causing a visible or infrared radiation-stimulable phosphor contained therein to absorb high energy radiation which has passed through an object, (ii) means for stimulating said phosphor with visible or infrared radiation to release the energy stored as fluorescent light, and (iii) means for detecting said fluorescent light, said apparatus being characterized in that said phosphor is a green emitting terbium activated alkali metal tantalate, wherein said phosphor is represented by the following general formula:

$$Li_{1-x}A_xTaO_3 \cdot yMe:zTb$$

wherein A is an element selected from the group consisting of Na, K, Rb, and Ce; Me is at least one metal selected from the group consisting of Mg, Ca, Sr, Ba, Al, Ga, Ge, Pb, Bi transition elements and lanthanides, and x, y and z are numbers satisfying the conditions $0 \leq x < 1$, $0 \leq y < 0.1$, and $0 < z \leq 0.1$.

15. The apparatus for recording and reproducing a radiation image of claim 14, wherein said phosphor is represented by the following general formula $$, Li_{1-x}A_xTaO_3 \cdot yMe:zTb$$

wherein A is an element selected in the group consisting of Na, K, Rb and Ce; Me is at least one metal selected in the group consisting of Mg, Ca Sr, Ba, Al, Ga, Ge, Pb, Bi, Zr, W, Zn, Sm, Eu, and Gd, and x, y and z are numbers satisfying the condition $0 \leq x < 1$, $0 \leq y < 0.05$ and $0 < z \leq 0.01$.

16. The apparatus for recording and reproducing a radiation image of claim 14, wherein said phosphor is stimulated with a radiation having a wavelength in the range of 400 to 1100 nm.

17. The apparatus for recording and reproducing a radiation image of claim 14, wherein said phosphor emits a fluorescent light having a wavelength higher than 500 nm.

18. The apparatus for recording and reproducing a radiation image of claim 14, wherein said phosphor emits a fluorescent light having a wavelength of from 500 to 600 nm.

* * * * *

UNITED STATES PATENT AND TRADEMARK OFFICE
CERTIFICATE OF CORRECTION

PATENT NO. : 5,367,173
DATED : November 22, 1994
INVENTOR(S) : Morlotti

It is certified that error appears in the above-indentified patent and that said Letters Patent is hereby corrected as shown below:

Column 2, line 55, delete "Sin" and insert --Sm--.

Column 6, line 4, delete "tile" and insert --the--.

Column 13, line 32, delete "Sim" and insert --Sm--.

Signed and Sealed this

Eleventh Day of April, 1995

*Attest:*

BRUCE LEHMAN

*Attesting Officer*     *Commissioner of Patents and Trademarks*